US009367975B2

(12) United States Patent
Robertson et al.

(10) Patent No.: US 9,367,975 B2
(45) Date of Patent: *Jun. 14, 2016

(54) SYSTEM FOR PERMITTING SECURE ACCESS TO A RESTRICTED AREA

(71) Applicant: Yikes LLC, Monticello, IN (US)

(72) Inventors: William Benjamin Robertson, Monticello, IN (US); Bob P Keck, Noblesville, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/740,649

(22) Filed: Jun. 16, 2015

(65) Prior Publication Data

US 2015/0279130 A1  Oct. 1, 2015

Related U.S. Application Data

(63) Continuation-in-part of application No. 14/307,667, filed on Jun. 18, 2014, now Pat. No. 9,129,450, which is a continuation of application No. 12/536,103, filed on Aug. 5, 2009, now Pat. No. 8,791,790, which is a continuation-in-part of application No. 12/368,601, filed on Feb. 10, 2009, now abandoned.

(51) Int. Cl.
*G05B 19/00* (2006.01)
*G07C 9/00* (2006.01)
*H04W 4/00* (2009.01)
(Continued)

(52) U.S. Cl.
CPC ........ *G07C 9/00007* (2013.01); *G07C 9/00571* (2013.01); *G07C 9/00904* (2013.01); *H04L 63/0876* (2013.01); *H04W 4/008* (2013.01); *H04W 12/06* (2013.01);
(Continued)

(58) Field of Classification Search
CPC .............. G07C 9/00007; G07C 2009/00793; G07C 9/00111; G07C 9/00571; G07C 9/00904; H04L 63/08; H04L 63/0876; H04W 4/008; H04W 12/06; H04W 88/06
See application file for complete search history.

(56) References Cited

U.S. PATENT DOCUMENTS 4,401,260 A  8/1983  Grant
4,868,914 A  9/1989  Yamashita
(Continued)

FOREIGN PATENT DOCUMENTS

EP  1965595 A1  9/2008
JP  08184236 A  7/1996
(Continued)

OTHER PUBLICATIONS

Signature by VingCard—VingCard Elsafe—ASSA ABLOY—"VingCard Outpacing Industry in RFID/NFC Skill: Displays Electronic Lock Advancement for Remote Hotel Check-in/Check-out AT IH/MRS" Paris Nov. 6, 2006—VingCard Elsafe s.a.s.—37, rue Adam Ledoux—BP 46—92 404 Courbevoie Cedex France.

*Primary Examiner* — Kerri McNally
*Assistant Examiner* — Renee Dorsey

(57) ABSTRACT

A wireless device access system employs short-range wireless communication to require the proximity of a user device to a restricted area prior to communicating an unlock request. The access system authenticates the unlock request and the proximity of the user to the restricted area prior to transmitting an unlock command to an access governor. Additionally, the wireless device may require the proximity of a user token prior to operation and/or the access system may include an override within the restricted area blocking any unlock command.

20 Claims, 6 Drawing Sheets

(51) Int. Cl.
*H04L 29/06* (2006.01)
*H04W 12/06* (2009.01)
*H04W 88/06* (2009.01)

(52) U.S. Cl.
CPC . *G07C 9/00111* (2013.01); *G07C 2009/00793* (2013.01); *H04W 88/06* (2013.01)

(56) References Cited

U.S. PATENT DOCUMENTS

| | | | |
|---|---|---|---|
| 5,014,050 A | 5/1991 | Lewiner et al. |
| 5,337,588 A | 8/1994 | Chhatwal |
| 5,614,703 A | 3/1997 | Martin et al. |
| 5,898,904 A | 4/1999 | Wang |
| 5,990,885 A | 11/1999 | Gopinath |
| 6,553,238 B1 | 4/2003 | Ginzel et al. |
| 6,674,403 B2 | 1/2004 | Gray et al. |
| 6,772,331 B1 | 8/2004 | Hind et al. |
| 6,900,603 B1 | 5/2005 | Del Vecchino |
| 7,012,503 B2 | 3/2006 | Nielsen |
| 7,039,435 B2 | 5/2006 | McDowell et al. |
| 7,114,178 B2 | 9/2006 | Dent et al. |
| 7,315,823 B2 | 1/2008 | Brondrup |
| 7,315,824 B2 | 1/2008 | Chen et al. |
| 7,403,743 B2 | 7/2008 | Welch |
| 7,565,411 B1 | 7/2009 | Turcotte |
| 7,769,394 B1 | 8/2010 | Zhu |
| 7,953,392 B2 | 5/2011 | Karstens |
| 2002/0055879 A1 | 5/2002 | Wengrovitz et al. |
| 2002/0099945 A1 | 7/2002 | McLintock |
| 2002/0183008 A1 | 12/2002 | Menard |
| 2003/0023463 A1 | 1/2003 | Dombroski et al. |
| 2003/0064732 A1 | 4/2003 | McDowell et al. |
| 2003/0118237 A1 | 6/2003 | Laird |
| 2003/0149576 A1 | 8/2003 | Sunyich |
| 2003/0208386 A1 | 11/2003 | Brondrup |
| 2004/0059815 A1 | 3/2004 | Buckingham et al. |
| 2005/0051620 A1 | 3/2005 | DiLuoffo et al. |
| 2005/0094610 A1 | 5/2005 | de Clerq et al. |
| 2005/0210283 A1 | 9/2005 | Kato |
| 2005/0241003 A1 | 10/2005 | Sweeney et al. |
| 2005/0261833 A1 | 11/2005 | Brosius et al. |
| 2006/0056353 A1 | 3/2006 | McBride |
| 2006/0106930 A1 | 5/2006 | Shaffer |
| 2006/0116127 A1 | 6/2006 | Wilhoite et al. |
| 2006/0152336 A1 | 7/2006 | Turkovich, Jr. et al. |
| 2006/0154687 A1 | 7/2006 | McDowell et al. |
| 2006/0164205 A1 | 7/2006 | Buckingham |
| 2006/0183462 A1 | 8/2006 | Kolehmainen |
| 2006/0187034 A1 | 8/2006 | Styers et al. |
| 2007/0176739 A1 | 8/2007 | Raheman |
| 2008/0137631 A1 | 6/2008 | de Clerq et al. |
| 2008/0150680 A1* | 6/2008 | Casey ............... G07C 9/00166 340/5.7 |
| 2008/0176580 A1 | 7/2008 | Dery |
| 2008/0214209 A1 | 9/2008 | Ratnakar |
| 2008/0221862 A1 | 9/2008 | Guo et al. |
| 2008/0301580 A1 | 12/2008 | Hjelmeland Alams et al. |
| 2009/0066476 A1 | 3/2009 | Raheman |
| 2009/0093234 A1 | 4/2009 | Cai et al. |
| 2009/0119698 A1 | 5/2009 | Kuijlaars |
| 2009/0261965 A1 | 10/2009 | Cum |
| 2009/0299777 A1 | 12/2009 | Silberman |
| 2009/0313046 A1 | 12/2009 | Badgett et al. |
| 2010/0057501 A1 | 3/2010 | Mohammed |
| 2011/0102131 A1 | 5/2011 | de Clerq et al. |

FOREIGN PATENT DOCUMENTS

| | | |
|---|---|---|
| JP | 2002013324 A | 1/2002 |
| JP | 2003138816 | 5/2003 |
| KR | 10-2006-0088613 | 8/2006 |

* cited by examiner

10

15

20

25

SYSTEM FOR PERMITTING SECURE ACCESS TO A RESTRICTED AREA

CROSS REFERENCE TO RELATED APPLICATIONS

The present application is a continuation-in-part of U.S. patent application Ser. No. 14/307,667 filed Jun. 18, 2014, which is a continuation of U.S. patent application Ser. No. 12/536,103 filed Aug. 5, 2009, which is a continuation-in-part of U.S. patent application Ser. No. 12/368,601 filed Feb. 10, 2009, all of which are entitled "A System and Method for Accessing a Structure Using a Mobile Device" and all are hereby incorporated by reference to the extent not inconsistent.

FIELD OF THE INVENTION

The present invention generally relates to an access system including a wireless user device and a proximity verification device. More particularly, the present invention pertains to an access system which receives a request for access from a user's mobile phone and confirms its using periodically changing access codes.

BACKGROUND

In the United States alone there are more than 4.5 million hotel rooms available to travelers. Currently, these hotel rooms have an industry-wide occupancy rate of just over 60%, with the occupancy rates of various geographic areas and individual hotels varying wildly. This occupancy rate often drastically affects the bottom line of a hotel or hotel chain. To increase their occupancy rate, and thus their profitability, hotels make every attempt to please their guests in order to encourage them to return. In order to please their guests, and lure new ones, hotels have continuously added amenities, such as on-site spas, restaurants, fitness centers, and in-room coffee machines or mini-bars.

In addition to these additional amenities, hotels have adopted a variety of different check-in procedures to minimize the time required for a guest to check-in. These procedures include adopting electronic key cards as opposed to mechanical keys, which enhances guest security and allows the hotel to change to a new room key, alleviating the need for the guest to return the keys to the front desk at check-out. However, even these procedures still present a distracting delay to a hotel's most valuable customers, business travelers. To increase loyalty amongst these frequent travelers, among others, most major hotel chains have invested tremendous assets in developing rewards programs, such as the Hilton HHonors® Program. The goal of these programs is to allow hotel chains to better understand the needs of travelers and make their stay as streamlined as possible. For instance, some hotels provide express check-in for a select set of their guests, while others provide check-in/check-out over the Internet or via a computer kiosk located in the hotel lobby. While these advances have certainly increased the occupancy rates of the various major hotel chains, they have not yet solved the problem of fully automating the guest check-in/check-out process, thereby allowing a guest to arrive at their hotel and enter their room without any additional time-consuming steps.

Similarly, these issues can be found in a number of situations that require secured access into a building, facility, or designated area, such as for example airline gates, concert or other event gates, and public transportation gates. This disclosure is applicable in all areas where customers are waiting in a queue for entrance or access to a structure, vehicle, venue, or any other type of restricted area.

DETAILED DESCRIPTION OF THE INVENTION

Figure 1A:
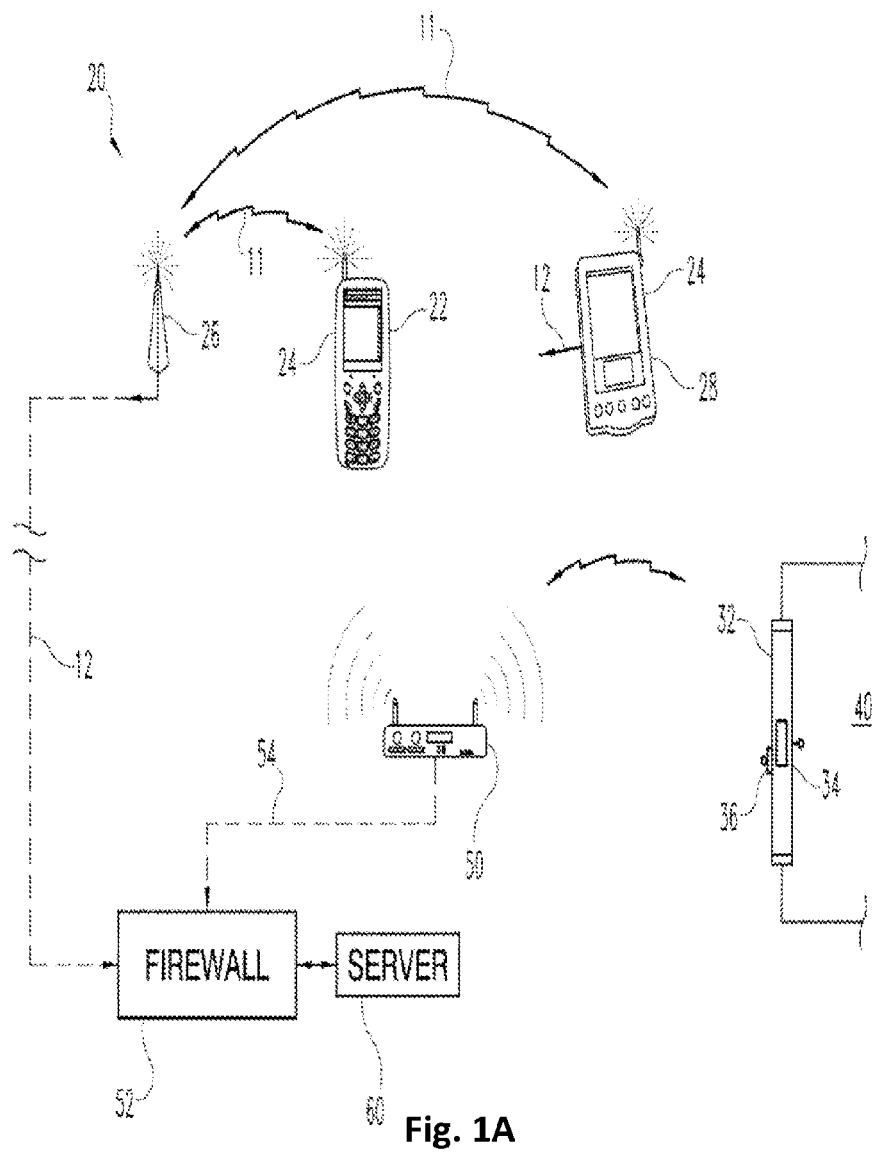
FIG. 1A is a diagrammatic view of an access system according to one implementation of the present invention.

For the purposes of promoting and understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Currently, systems exist, such as the Signature RFID/NFC system from VingCard, which provide a user access to a hotel room using their mobile phone. However, such systems all require a specialized transceiver within the door of the hotel room and the user's mobile phone such that the two may communicate using a short-range wireless technology. Only a slight fraction of existing mobile phones are currently capable of being used with such systems, and it may be quite some time before such technology is common, if ever. Furthermore, many point-to-point prior art systems are unable to communicate directly with the door locks once deployed. The only way updating may be accomplished is through a user's device, which is not an inherently trusted source.

Other technologies exist for remotely allowing a user to monitor and control the open or closed state of an entryway, such as a garage door, using a cell phone connected to a controller over the Internet. However, these technologies do not provide sufficient security as they are designed for purposes other than secure access control. For example, these systems allow a user to send a command to open a door from any location where they have Internet access. However, their unlimited availability also introduces several significant vulnerabilities to unauthorized access. As such, many problems exist in the prior art which are solved by the secure access system of the present invention.

As shown in FIG. 1A, one embodiment of an access system 20 advantageously permits a user to access a structure 40 using a wireless device 24. In addition to lodging and workplace access systems, it will be appreciated that similar embodiments of the access system to be described also encompass systems for controlling access to other structures or openings/doors thereof. In the illustrated embodiment, according to FIG. 1A, the described system comprises an access system 20 for allowing a hotel guest to access their assigned hotel room 40 using a wireless device 24, which in the preferred form, is the user's Bluetooth® capable cell phone 22 or other wireless appliance 28. As such, it will be understood that many of the descriptions herein with respect to a hotel environment and the like are meant for illustrative purposes and that the concepts herein are generally applicable to a general safety and security access system and are not limited to only a hotel room access system.

Examples of other structures for which the novel access system may be adapted include other rooms within a hotel (i.e. workout rooms, pools, VIP lounges), office buildings, school/university buildings, warehouses, and portions thereof, event ticket gates/turnstiles, airplanes, airport security points, movie theatres, safety deposit boxes, mailboxes, lockers, or other enclosures for which providing selective user access is desired. Other applications that may not necessarily be structures, but shall be referred to generally herein as a "structure" in this application can include any restricted area, such as for example, parking lots and garages, public transit access gates, public buses, railroad terminals, subway terminals, other transportation gates and checkpoints. The terms "structure" and "restricted area" will be understood by one skilled in the art to be used interchangeably herein.

Additionally, as explained later, access system 20 may also provide the user with various features including, but not limited to, automated check-in/check-out via an electronic kiosk or their wireless device, access to restricted members-only areas or lounges, and the like. Other features of access system 20 include the ability to request various reports on activity relating to the entry of various structures. Illustratively, some embodiments of the access system 20 allow the system to provide an activity log that reports the access requests during a specified period of time or for a specified user.

As shown in FIG. 1A, according to the illustrative embodiment, the access system 20 interfaces with one or more wireless devices 24, such as cell phone 22 or wireless appliance 28, to allow a user to access their assigned hotel room. Cell phone 22 is preferably a mobile phone used for mobile voice or data communication over a network of cell towers. In addition to the standard voice function of a mobile phone, cell phone 22 preferably supports many additional services, and accessories, such as SMS for text messaging, email, packet switching for access to the Internet, Bluetooth, infrared, and GPS.

Illustratively, in some embodiments, the access system 20 is operably coupled to data network 12. Data network 12 is preferably the Internet, which is a TCP/IP based global network; however, the user of the term "Internet" herein shall be understood to refer to at least a portion of any public interconnected electronic network which interchanges data by packet-switching.

More specifically, access system 20 may utilize cellular phone network 11 and data network 12 to interface with a wireless device 24, such as cell phone 22. Cellular phone network 11 may comprise a variety of communication networks, including without limitation the universal mobile telecommunications system (UMTS), global system for mobile communication (GSM), and a code division of multiple access (CDMA) network, or similar technology. Cellular phone network 11 utilizes cell tower 26 to establish a wireless bi-directional transmission link between data network 12 and cell phone 22, which may comprise a wireless data link, such as the Evolution-Data Optimized (EVDO), Enhanced Data rates for GSM Evolution (EDGE), 3G, 4G, LTE, WiMax, or other wireless data connection. Similarly, other wireless appliances 28, such as Palm, Samsung, and Motorola smartphones or other portable wireless appliances such an the iPod Touch or Microsoft Zune may be configured to connect to access system 20 through access node 50 to allow a user to access their hotel room.

Alternatively, or additionally, access system 20 utilizes at least one access node 50 to interface with wireless device 24. Access node 50 is a wireless node implementing a short-range wireless standard, such as Bluetooth®, which once paired with, may provides access to the Internet and data network 12 to wireless device 24 via internal network 54, in addition to server 60. Additionally, in a further form, access node 50 preferably broadcasts a wireless signal, implementing a wireless local area network, such as 802.11 a/b/g/n or the like thereby providing Internet connectivity via a traditional wireless network to hotel guests. According to the illustrative embodiment, access node 50 broadcasts information which is linked to the location of the user device over one or both of its short-range wireless signals to wireless device 24.

In the illustrative form, access system 20 includes a plurality of access nodes, such as access node 50, where each node is strategically positioned near a specified structure (i.e. a hotel room). The access nodes are preferably always in a discoverable mode so that wireless devices 24 may be paired with them on demand in the event the wireless device 24 is authorized, such as by having an authorized MAC address. In a further form, the access nodes are not in a discoverable mode and the pairing of the access nodes with wireless device 24 occurs prior to the user's arrival programmatically. Illustratively, in some embodiments, access node 50 is operatively connected to server 60 to process and authenticate electronic unlock requests from wireless devices 24. Firewall 52 includes at least a hardware or software implemented firewall or other selected security features to prevent external access to server 60 or access node 50.

The location information maintained by access node 50 is linked to the present/assigned location of the node and is used in processing any unlock request. For example, an access node on the fourth floor of a hotel in downtown Chicago may be assigned a unique hotel identifier coupled with a hotel zone identifier. Alternatively, the node may be assigned a single identifier which is then linked to its location by the wireless device 24 or server 60.

Access system 20 additionally comprises a mechanical lock 34 for locking and unlocking a structure 40 (partially shown). In the illustrated embodiment, a user gains access to the structure 40 via door 32. In the illustrative embodiment, mechanical lock 34 is a mechanical door lock, which includes a locking mechanism similar to a common entry or exterior lock, but is further capable of self-unlocking in response to an electronic signal. In a further form, the lock 34 includes electronics or circuitry to enable it to periodically receive unlock keys and verify the unlock requests against them when appropriate. In alternate forms the lock 34 may include an existing or traditional lock for securing a door combined with a separate but connected device for performing these functions, such as to enable retrofitting or combination with separate locking devices.

For purposes of non-limiting example, mechanical lock 34 may include a cam lock, rotary latch, electro-mechanical lock, magnetic lock, or the like. According to one preferred form, lock 34 unlocks in response to an electrical signal sent from an access node 50. In an alternate form, the lock 34 unlocks in response to an electronic signal sent from a wireless device 24. In one form, the electrical signal is sent wirelessly, such as over a low-power RF connection, such as a Zigbee® or Bluetooth® connection (including Bluetooth® LE). In a further preferred form, the lock 34 returns to a locked state following the passage of a predetermined time period or a user opening and closing the door following the receipt of an unlock signal. In some additional forms, lock 34 or door 32 may also include a mechanical key slot, key card, or other entry permitting authentication means 36 in addition to, or as backup for, that described herein with respect to lock 34. In addition, it shall be appreciated that system 20 may be applied to access restrictions other than locks including, for example, an elevator control system providing limited access, a garage door, or others access barriers, as described later.

In a further embodiment, the lock 34 can be associated with an access gate or turnstile, where the access gate or turnstile may act in a similar capacity as a door 32, and be used to control access into any restricted area, such as for example, an event venue or public transportation terminal (i.e. subway terminal, bus station, train terminal, or airport gate). Upon receiving the unlock keys and verifying the unlock requests against them then—as appropriate—allows the user access through the turnstile, gate, or other access control mechanism. In this embodiment the unlock keys could be an event ticket, airline ticket, or public transit pass.

According to an exemplary embodiment illustrated by FIG. 1A, server 60 operates to receive unlock requests from access node 50 over internal network 54. In one form, the server 60 serves to authenticate the request or a portion thereof using a reservations and occupancy database, while in other forms, the access node 50 may perform at least a portion of the authentication. In the illustrative embodiment, server 60 processes each request corresponding to an unlock request received by access node 50 from wireless device 24, and upon proper authentication, confirms the granting of the request to access node 50 which then transmits an electronic signal to the corresponding lock, such as lock 34, permitting access to the structure 40. While server 60 is described and illustrated as being a server, it should be understood that server 60 may be any computer, including a client server arrangement. Server 60 may interface with access node 50 by either a wireless or hardwired interconnection. Preferably, the connection is a secured connection. A non-limiting example list of potential interfaces includes IR, optical, RF, serial port, IP network, and USB. Additionally, the functions of server 60 and access node 50 may be integrated into one computer system. Further, some or all of the functions of server 60 may be implemented by a remote server or other cloud based configuration.

In one form, access node 50 is fixed at a single position, but in an alternate form, access node 50 may be moveable, such as located within an elevator, and include a floor detector, so that the node may broadcast information linked to the appropriate floor upon which it is currently located. In a further form, an access node 50 is fixed within an elevator and connected to the elevator control system to allow the wireless device to communicate floor authorization information to access node 50. As such, the wireless device 24 may broadcast a floor to which the user is authorized to access so that the user may select that floor. In a further form, the elevator may be automatically commanded to take the user to that floor by access node 50 or server 60. As such, the user is enabled to access the floor or may experience a touchless trip to the proper floor.

In still other embodiments, lock 34 is operably coupled to an override switch (not shown) having an access disable state. Asserting the override switch prevents the access system 20 from permitting access to corresponding structure 40. As one non-limiting example, the override switch may be asserted when a guest engages a deadbolt or bar latch within their hotel room. In some embodiments of the access system 20, the override switch is incorporated into an electronic control, not shown here, accessible to the user within structure 40.

A flowchart illustrating one set of steps performed in configuring a wireless device 24 for use in accessing a structure 40 according to one embodiment of the present invention is shown. The process involves a wireless device 24 and the various other components of access system 20. The following description is with continuing reference to access system 20 of FIG. 1A. As shown in FIG. 1A, the wireless device is cell phone 22; however, it is understood that other networked appliances are also intended. It shall be appreciated that while the process is described with respect to the reservation and check-in process common for a hotel and hotel room the novel access system could be adapted for application in various settings to provide for the same desired result. As such, the confirmation and check-in process may be replaced with an employee authorization process or the like depending upon the nature of the structure being utilized.

Figure 1B:
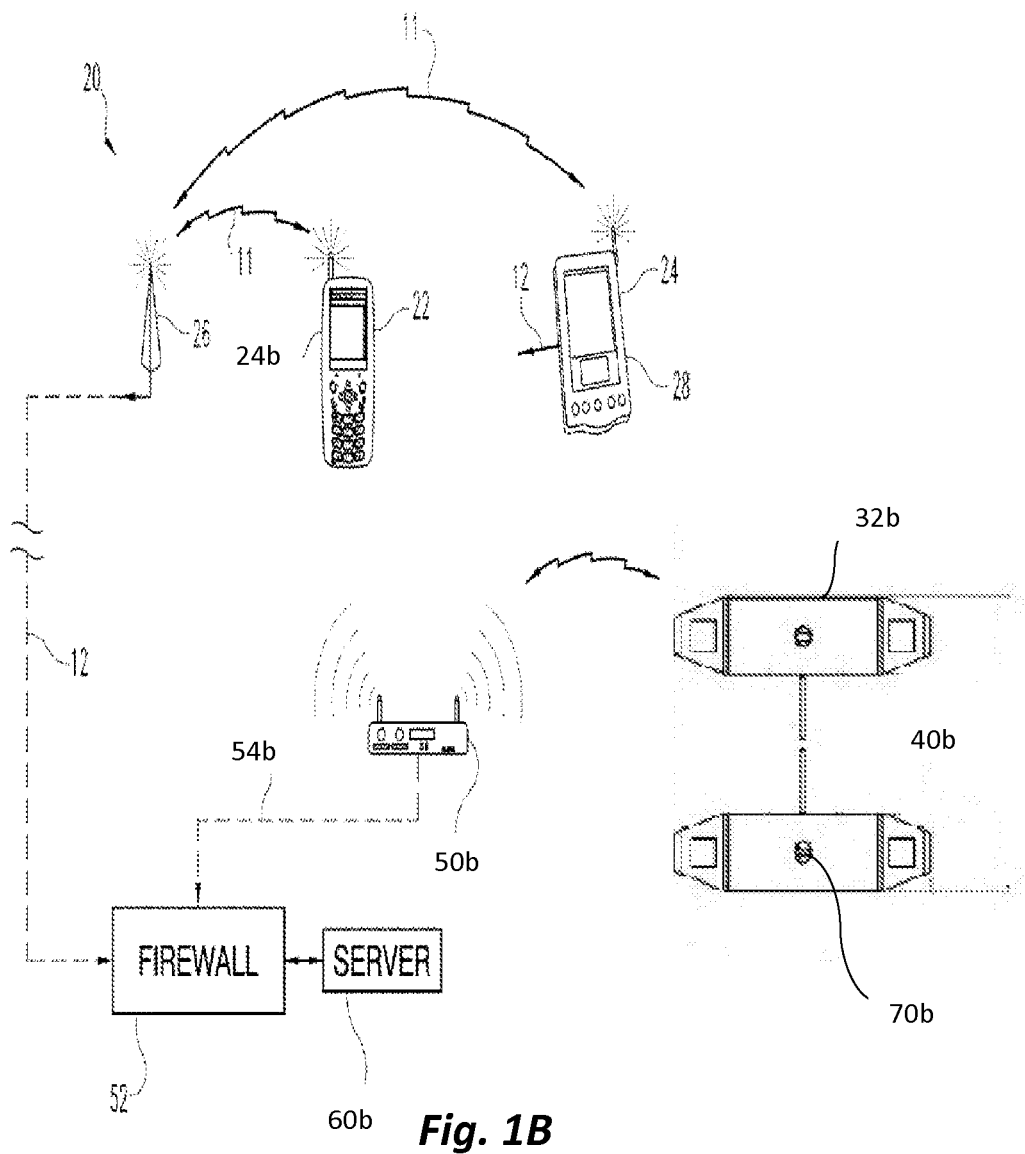
FIG. 1B is a diagrammatic view of an access system according to one implementation of the present invention.

In another embodiment illustrated by FIG. 1B, the door 32 shown in FIG. 1A may be replaced by an access governor 32b, such as a security guard, mechanized gate, authorized airline personnel, turnstile, or other authorized personnel. Upon receiving the unlock keys and verifying the unlock requests, the access node 50b may provide an electronic signal to an indicator 70b that may notify the access governor 32b when it is appropriate to allow the user access to the restricted area 40b. As shown in FIG. 1B, the indicator 70b may be any form of indication of granting or denying access, including but not limited to, an electrical signal, an audio or visual notification with a light or a buzzer, or a combination of both. Additionally, the indicator 70b may also be capable of providing additional data or another electronic signal to another wireless device, which may be associated with any access governor 32b. The access node 50b gives either (i) an affirmative notification associated with an unlock key, whereupon the access governor 32b permits user access into the structure or restricted area; or (ii) a denial notification whereupon the access governor 32b is instructed to prevent the user from accessing the restricted area 40b. Similarly, the access node 50b may transmit an authentication signal or data to another wireless device in proximity to or otherwise associated with the access governor 32b and may provide the access governor 32b with other data that may be associated with the user's unique identifier.

According to another embodiment illustrated by FIG. 1B, server 60b operates to receive unlock requests from access node 50b over internal network 54b. In one form, the server 60b serves to authenticate the request or a portion thereof using a database, while in other forms, the access node 50b may perform at least a portion of the authentication. As shown in FIG. 1B, server 60b processes each request corresponding to an unlock request received by access node 50b from wireless device 24b, and upon proper authentication, confirms the granting of the request to access node 50b which then transmits an electronic signal to the indicator 70b which then notifies the access governor 32b to permit or not to permit access to the restricted area 40b. While server 60b is described and illustrated as being a server, it should be understood that server 60b may be any computer, including a client server arrangement. Server 60b may interface with access node 50b by either a wireless or hardwired interconnection. Preferably, the connection is a secured connection. A non-limiting example list of potential interfaces includes IR, optical, RF, serial port, IP network, and USB. Additionally, the functions of server 60b and access node 50b may be integrated into one computer system. Further, some or all of the functions of server 60*b* may be implemented by a remote server or other cloud based configuration.

An optional feature of the embodiment shown in FIG. 1B is the addition of a secondary authenticator. In this option, the secondary authenticator is any suitable device or system that augments the primary access governor to confirm the electronic signal from the access node is appropriately associated with the distinct user. For example, the secondary authenticator may be a motion sensor that, in one example, determines whether the user has passed through the access governor. The secondary authenticator is in electronic communication with the access node. In an additional optional embodiment, the access governor may be in the form of a vestibule having a first gate that allows access into an intermediate check point and a second gate that allows access into the restricted area, wherein the user may be allowed entry past the first gate into an intermediate check point at which point the gate closes behind them to ensure a controlled number of users entry into the intermediate check point, such as a single user at a time. Upon receiving an access request and authorization, the second gate opens allowing the controlled number of users access into the restricted area. This embodiment provides additional assurance that only users with proper credentials are allowed access into the restricted area.

Similar to the exemplary embodiment show in FIG. 1B, a gate can be understood to be a virtual gate that does not physically impede a user, but encompasses a defined area and has at least one motion sensor. In this exemplary embodiment, a motion sensor may sense the presence of a user and may track their location in a restricted or unrestricted area. Additional motion sensors may be used to track the movements of a user within a restricted or unrestricted area which may provide an additional security function. Upon verifying the unlock key(s), an access node may provide an electronic signal to an indicator that notifies an access governor when it is appropriate to allow the user access to the restricted area. Additionally, a second or the same motion sensor can be used to trigger the requirement of a digital impression of the user as they access a restricted area before exiting the gate, such as a biometric scan or photograph. If motion is detected and a digital impression was not recorded an indicator may notify the access governor. This embodiment could be implemented in a number of uses for airline gate access, approval, and entry to and through the jet bridge. Similarly, this embodiment could be used in many service drive-through lanes to sense a user in a car and trigger a charge to their electronic wallet upon sensing the user at a pick-up window. Another application of a motion sensor, is its ability to sense a user approaching a monitor and then to highlighting the user's flight in a predetermined color on the monitor. This may provide the user the ability to quickly identify the gate for their flight without unduly searching and time delay.

In another optional aspect of the invention, the access nodes are capable of detecting multiple users in the access gate and the identity of each of the users. Multiple access nodes can be used to determine if the users are entering or exiting a predetermined area. This aspect of the invention could be used for, but not limited to, use in conference room/conference attendance monitoring, crossing a secured border, commercial security for natural disasters or emergencies, and the ability to split checks between different users at the same table.

Figure 2:
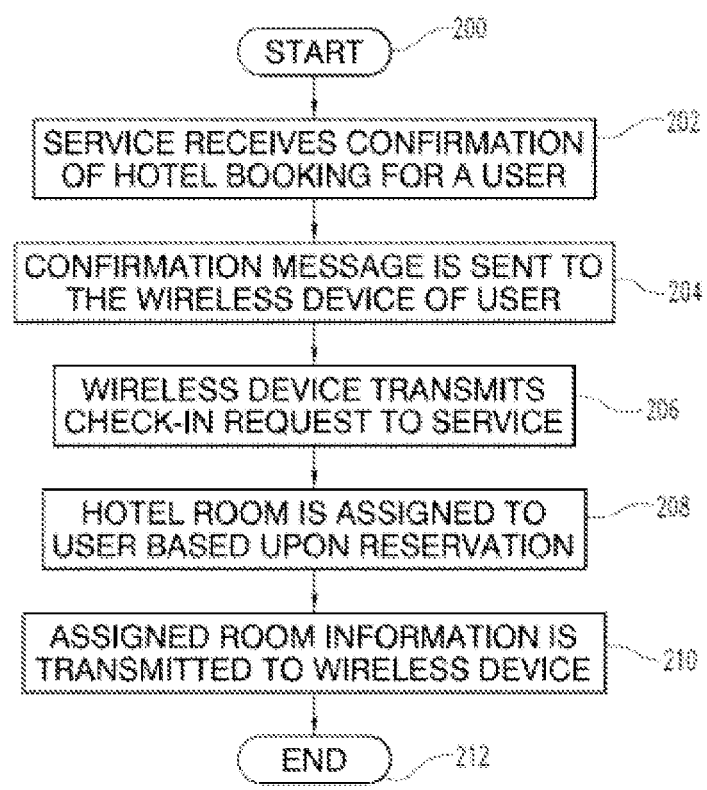
FIG. 2 is a process flow diagram illustrating one set of steps performed in enabling a user to access a structure using a wireless device and the novel access system.

As shown in FIG. 2, the process begins at start point 200 with the novel service receiving confirmation of the booking of a hotel stay for a user (stage 202). The confirmation information preferably identifies the hotel and the user and includes a check-in/check-out date along with details of the type of room requested/reserved. In the preferred form, this confirmation information is received by server 60 as a result of a hotel booking being made for a user either online, in person, or over the phone.

Subsequent to receiving the confirmation information, a confirmation message is sent to the wireless device 24 of the user (stage 204). Preferably, a phone number or e-mail address corresponding to the user's wireless device is submitted along with the booking information. The confirmation message may be in the form of an e-mail, SMS, text message, push notification or the like, sent over data network 12. The confirmation message includes a hotel identifier, user identifier, and an access string. In the illustrated embodiment, the confirmation message is handled by an installable application on the user's wireless device 24 which is available for install to the user, such as via the hotel website, a third-party website, other application source, or download source indicated in the confirmation message. Preferably, the application is suitable for operation on various mobile operating systems including Microsoft Mobile, Symbian OS, Palm OS, webOS, Mobile Linux, Apple OSX (iPhone® and iPad®), Android and MXI. In other forms, the application used by wireless device 24 may be browser-based and/or embedded software, to name a few non-limiting examples.

As a result of receiving the hotel identifier, the application will be able to retrieve access codes to enable wireless device 24 to automatically pair with access nodes at the appropriate hotel upon arrival. Preferably, those access codes will only be available the day of scheduled arrival or slightly before to prevent unauthorized access during the designated start and ends times of the stay, which are set by the system. In a further form, the pairing may be established automatically prior to the user and device 24 arriving at the hotel. In order to allow the user to access their room, a specific room must be assigned to the user. Traditionally, this has occurred either the day of check-in or during the check-in process. However, in the illustrative form, the user is assigned a specific room automatically prior to or upon arriving at the hotel. In one form, this occurs as a result of the wireless device 24 associated with the user transmitting a check-in request to wireless node 50 which is then sent to server 60 (stage 206). The check-in request is preferably triggered by the user's wireless device 24 connecting to an access node 50 within the hotel indicated by the hotel identifier of the confirmation message during the timeframe indicated by the check-in/checkout dates. Alternatively, the check-in request may be transmitted via an electronic kiosk in the hotel lobby, via the user device 24 over data network 12, or an actual in-person check-in entered by a hotel representative. It is preferred that the check-in request be sent over network 54 to server 60. In an alternate form, the check-in request may be sent over the Internet to server 60 without the user being present at the hotel.

Upon receiving a check-in request, access node 50 communicates with server 60 to confirm the dates and access string provided by the wireless device 24 and assign a room matching the reservation of the user (stage 208). In the preferred form, this is accomplished by server 60 which interfaces with the hotel's management system to store the appropriate access credential in an electronic database accessible to server 60. In addition, the server 60 associates a key code matching the user's confirmation message with the assigned room. In an alternate form, step 208 may be omitted and the access system 20 may simply automatically assign a room to the user, as described above with respect to step 208, on the day of check-in absent an indication of the user's presence at the hotel or the like.

The details of the assigned room, including its number and location, are then sent in a return message to the user's wireless device 24 by server 60 via access node 50 (stage 210). This enables the user to send an electronic request for access to the hotel room to access node 50 using wireless device 24. In one form, the MAC address of the wireless device 24 or data based thereon is transmitted along with the request for access, and this MAC address is similarly stored in the electronic database in association with the assigned room. The process ends at end point 212. It shall be appreciated that this process may be modified to accommodate more than one authorized hotel guest per room, such as having two wireless devices authorized to enter the same hotel room, or allowing a current guest to authorize the wireless device of another to access the hotel room for any portion of their remaining stay.

In continuing the description of the embodiment described with respect to FIG. 2, a flowchart illustrating one set of steps performed in allowing a user to access structure 40 using wireless device 24 and the various other components of access system 20 is shown. The following description is with continuing reference to access system 20 of FIG. 1A and the description accompanying FIG. 2.

Figure 3:
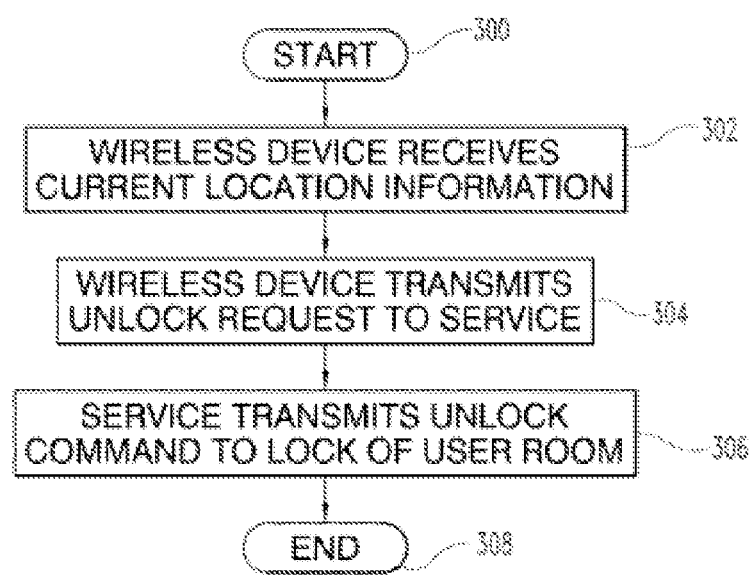
FIG. 3 is a process flow diagram illustrating one set of steps performed in providing access to structure to a user using a wireless device and the novel access system.

As shown in FIG. 3, the process begins at start point 300 with the wireless device 24 receiving location information linked to the current location of the user and wireless device 24 from access node 50 (stage 302). In one form, this location information is received or determined by wireless device 24 from access node 50 which is located near the user's assigned room (represented by structure 40). In the preferred form, access node 50 broadcasts a hotel identifier and a zone or area identifier which correspond to zones, such as floor, wings, or portions thereof in a hotel. In an alternate form, a unique identifier is sent along with a received unlock request by access node 50 which is then used as a lookup in a location table by wireless device 24 or by server 60. As a result, an added layer of security is provided by server 60 being configured to only authorize requests from access node 50 (which is an access node within range of the door requested to be unlocked) and subsequently authenticating those unlock requests received to confirm that the requesting wireless device 24 is authorized.

Depending upon the application, structure 40 may be within the broadcast range of access node 50, or the node 50 may be only located nearby, such as near the main elevator, stairway, hallway, or other essential entranceway. Once the wireless device 24 is within range of and is connected to access node 50, the wireless device 24 transmits an unlock request, which is received by access node 50 and passed on to server 60 (stage 304). Additionally, the access nodes 50 may be configured to require a predetermined signal strength prior to permitting an unlock request to be issued, to ensure that the user is in close proximity to the door which access is requested for. In the illustrated embodiment, this request is sent through internal network 54, but it shall be appreciated that the message may also be sent through another wireless network, such as 802.11 or another similar technology. The unlock request may include any of the following: hotel ID, room number, location information, user name, reservation number, check-in/check-out dates. In addition, other information may be included in the request.

In a still further form, the node 50 approximates the distance between itself and wireless device 24 using a signal strength determination. A zone may then be set (including a distance minimum or min/max range) which defines the distance the user along with wireless device 24 would be from the node 50 when in an acceptable vicinity of their assigned structure 40. If this determined distance does not match that set by the operator, then any unlock request send will not be authorized.

Once an unlock request is received by server 60, server 60 authenticates the MAC address of the wireless device as well as the validity of the current reservation and confirms the request with access node 50. Upon receiving this confirmation, access node 50 transmits an unlock command to the appropriate lock 34 using the Zigbee® or Bluetooth® LE connection (step 306). Upon receiving the unlock request, the lock then unlocks the structure and enables the user operating wireless device 24 to enter. The process ends at end point 308.

Figure 4:
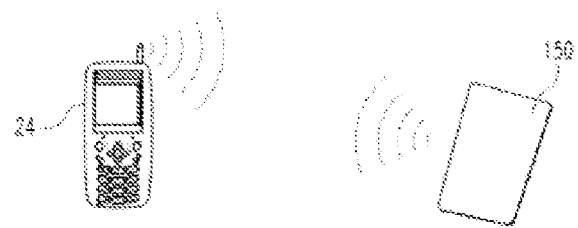
FIG. 4 is a diagrammatic view of a token suitable for use in one embodiment of the present invention.

Turning to FIG. 4, a user node suitable for use in a further embodiment of the present invention is illustrated. User token 150 is device suitable for being queried by a wireless device 24. Token 150 is optionally provided to the user by the hotel or structure during authorization. Token 150 may include a coded unique identifier or some other verifiable data. Prior to sending any request, such as an unlock request, wireless device 24 may optionally be programmed to query for the presence of token 150 within its presence. In the event that a token 150 having the verifiable data is not found, then the request may be blocked. However, in the event the token 150 is within the proximity of wireless device 24 the request may be transmitted. As such, the user may be required to carry token 150 to ensure that wireless device 24 only functions with access system 20 when in the presence of the authorized user. According to this embodiment, token 150 is a passive Bluetooth node, but may be any other short-range wireless device, such as RFID or the like. Preferably, token 150 does not require its own power source.

Figure 5:
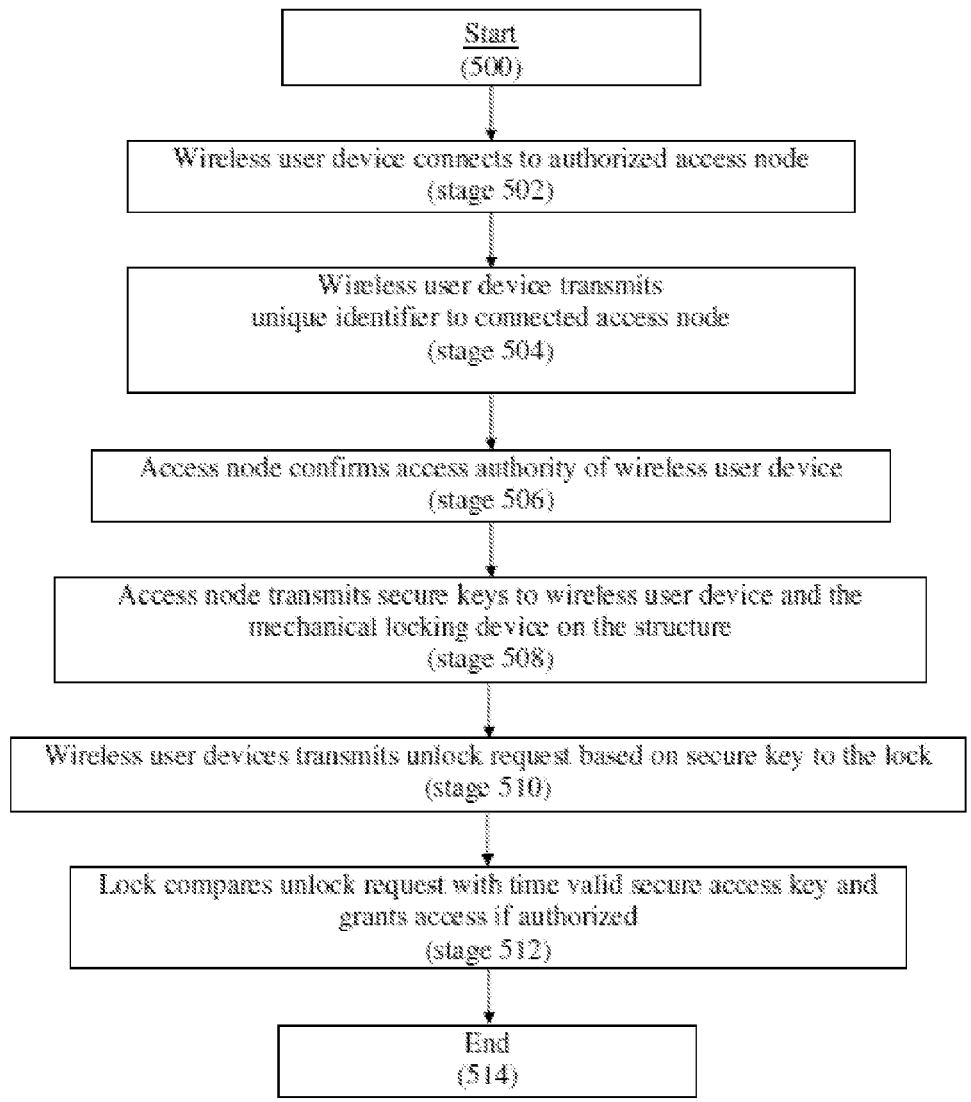
FIG. 5 is a process flow diagram illustrating an alternate set of steps performed in providing access to structure to a user using a wireless device and the novel access system.

In again continuing the description of the embodiment described with respect to FIG. 2, a flowchart illustrating one set of steps performed in an alternative process for allowing a user to access structure 40 using wireless device 24 and the various other components of access system 20 is shown in FIG. 5. The following description is with continuing reference to access system 20 of FIG. 1A and the description accompanying FIG. 2.

Referring to FIG. 5, the process begins at start point 500 with the wireless device 24 connecting to an access node 50 (stage 502). As the wireless device 24 travels throughout a covered area, such as a hotel's grounds and/or interior spaces, it typically comes into contact with one or more access nodes 50. In the event that the access node 50 currently within range of the wireless device 24 is located near the user's assigned room (represented by structure 40) (or alternatively when access node 50 is programmatically authorized to permit access to the user's assigned room) access node 50 and wireless device 24 establish a connection and transmit information there between to confirm that wireless device 24 is authorized to access structure 40 (stage 504). It shall be appreciated that wireless device 24 and other access node(s) 50 may similarly establish a connection, such as for other purposes; however, the remainder of the process below would not be completed. For example, wireless device 24 may automatically connects with a network or wireless nodes 50 for purposes of providing Wi-Fi access within a hotel or other area surrounding the structure 40.

In this embodiment, the information transmitted between the wireless device 24 and the access node 50 in stage 502 is a unique identifier, such as a MAC address, or unique reservation ID which may have been previously provided to the wireless device 24 by server 60. It shall be appreciated that, in the described hotel context, neither the unique identifier utilized herein nor the unique reservation ID described herein has to be the exact reservation number or confirmation number used by the hotel, but only that the identifier selected identifies a reservation, either directly or indirectly. In one form, this unique reservation ID is provided to the wireless device 24 at or before check-in. It shall be appreciated that in other applications outside of a hotel, the wireless device 24 may provide merely a unique ID, such as a unique key, which identifies the device and/or user given that not all applicable scenarios operate for time limited locations in the way that hotel reservations do. For example in the scenario where the described system is implemented for a secured office, employees and other authorized persons could perpetually utilize unique IDs with no time limitation so long as they remain valid. Further, in the event the described system were used for attending a concert or boarding an airplane, a similar unique ID which may be associated with a concert date/time or boarding date/time, as the case may be, might be utilized.

In a further form, the unique reservation ID may provide to the access node 50 in stage 502 any of the following: unique key ID, hotel ID, room number, location information, user name, password, reservation number, check-in/check-out dates, or some combination thereof. Alternatively, this information may be derived from any information, such as a unique ID and/or encryption key, stored within wireless device 24 for purposes of uniquely identifying itself to access node 50.

Once the initial transmission occurs, access node 50 utilizes at least a portion of the information (or information derived therefrom) to confirm that wireless device 24 is authorized to access structure 40. As described above, in one embodiment, this request is sent through internal network 54 to server 60, but it shall be appreciated that the authorization request may also be sent through another wireless network, such as 802.11 or another similar technology.

According to this embodiment, once the authentication request is received by server 60, server 60 authenticates the reservation ID of the wireless device, including the validity of the current reservation and confirms the request with access node 50 (stage 506). Upon receiving this confirmation, access node 50 transmits a secure unlock key to the wireless device 24 which wireless device 24 may utilize to access structure 40 (stage 508). At or about the same time, the access node 50 transmits a matching or associated secure authorization key to the lock 34 of structure 40. In one form, the secure authorization key is transmitted wirelessly, such as by using an RF connection, to lock 34.

In a further form, both the secure unlock key and the secure authorization key provided by access node 50 are time limited in that they remain valid for only a short period of time, such as a day, an hour, thirty minutes, 15 minutes, 5 minutes, one minute, 30 seconds, 15 seconds, 10 seconds, or the like. Further, in this form, the access node 50 periodically transmits new secure unlock keys to wireless device 24 and also periodically transmits new secure authorization keys to lock 34 to replace the expiring keys (stages 508 repeats). In one form, this periodic transmission closely corresponds with the validity period associated with each.

Once a wireless device 24 receives a secure unlock key from access node 50, the wireless device may submit an unlock request to the lock 34 (stage 510). In one form, the unlock request is submitting directly from the wireless device 24 to the lock 34. Such an unlock request may be initiated by the user selecting an option on the wireless interface of wireless device 24. In another form, this may be initiated by the lock 34, such as when the lock 34 senses that a user is within range or when the lock 34 senses a capacitive touch, such as to the door handle. The unlock request may include the transmission of the most recent and the only valid secure unlock key or secure authorization key, or information created as a function of it, between wireless device 24 to lock 34. In one form, wireless device 24 transmits its secure unlock key to lock 34 which utilizes the received secure unlock key or information based on it and its own secure authorization key in order to determine whether the unlock request is authentic. In the event the unlock request is approved, the lock 34 unlocks the structure and enables the user operating wireless device 24 to enter (stage 512). The process ends at end point 514.

In another form, access system 20 additionally comprises a parking access device (not shown) such as a garage door or parking gate coupled to lock control unit 42 selectively permitting access to a parking lot or structure (not shown). In this illustrated embodiment, a user is able to gain access to the parking area via the garage door or parking gate. According to the preferred form, the parking access device permits a user's vehicle access to the parking area in response to an electrical signal sent from a control device. In one form, the electrical signal is sent wirelessly.

In further systems, a proximity node, similar to node 50, may be included in other areas so as to permit a user to access structures, such as a hotel parking garage, based upon the confirmation information sent to their wireless device or other information as described herein. As such, the user's parking duration could be easily calculated and charged to their hotel bill.

In still further systems, a notification process may be executed by server 60 such that upon detecting a current hotel guest has left the hotel, a request for hospitality and cleaning services may be generated. In one form, the server 60 may detect a hotel guest leaving as a message sent from the user's wireless device upon passing by a access node located near the user's assigned room and another access node at one of the various exits to the hotel. Alternatively, the user opening the exit of the parking garage using their wireless device may trigger such a notification.

In yet another system, the wireless device may transmit information to server 60 upon passing an access node which indicates the user's entrance into the hotel or the area of their assigned hotel room. This information may trigger the in-room temperature to be raised to a user-specified or standard level or it may trigger the lights to be turned on, as described in U.S. patent application Ser. No. 10/126,486 to Sunyich entitled "Personalized Smart Room", which is hereby incorporated by reference to the extent not inconsistent. Similarly, the wireless device may transmit information to server 60 upon passing an access node 50 which indicates the user's access into or out of a restricted area. This information may trigger a fee or charge to an electronic wallet, such as for example Google Wallet or Apple Pay, prior to sending the unlock request to an access node 50.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the inventions as described herein and/or by the following claims are desired to be protected.

Hence, the proper scope of the present invention should be determined only by the broadest interpretation of the appended claims so as to encompass all such modifications as well as all relationships equivalent to those illustrated in the drawings and described in the specification.

The invention claimed is:

1. An access system allowing a user to access a restricted area using a wireless user device, the access system comprising:
   a database storing access permissions identifying at least one wireless user device authorized to access said restricted area and one access node authorized to permit access to said restricted area;
   an access governor including a locking device securing a restricted area, said locking device having a short-range wireless receiver suitable for receiving unlock commands and responding by allowing a user access to said restricted area;
   an access node, separate from said locking device, positioned near said restricted area and having a short-range wireless radio for connecting to the wireless user device;
   a server operable to receive an unlock request associated with a wireless user device and a structure from said access node and transmit an authorized request to said access node upon authorizing said unlock request using said database,
   wherein said unlock request is authorized only if received from an access node authorized to permit access to said restricted area and originated from a wireless user device authorized to access said restricted area.

2. The access system according to claim 1, wherein said access node, comprises:
   a first short-range wireless radio using a wireless networking standard for receiving a wireless access request directly from a wireless user device; and
   a second short-range wireless radio using a wireless networking standard to transmit an unlock command directly to said locking device to permit access to said restricted area in response to receiving an authorized request.

3. The access system according to claim 1, wherein said wireless user device is a mobile telephone.

4. The access system according to claim 3, wherein said restricted area is an airline gate.

5. The access system according to claim 3 further comprising a secondary authenticator.

6. The access system according to claim 3, wherein said restricted area is a public transit terminal.

7. The access system according to claim 3, wherein said restricted area is a vehicle.

8. The access system according to claim 3, wherein said access governor is turnstile.

9. The access system according to claim 3, wherein said access node is configured to trigger a fee to an electronic wallet that is linked to user when said server requires a fee to enter or exit said restricted area.

10. The access system according to claim 2, wherein said first short-range wireless radio uses first wireless networking standard for receiving a wireless access request directly from a wireless user device; and
   said second short-range wireless radio uses a second wireless networking standard which is different than said first wireless networking standard.

11. An access system allowing a user to access a restricted area using a wireless user device, the access system comprising:
   a database storing access permissions identifying at least one wireless user device authorized to access said restricted area and one access node authorized to permit access to said restricted area;
   an access governor securing the accessibility of a restricted area;
   an indicator configured to provide a notification to said access governor, said indicator having a short-range wireless receiver suitable for receiving access commands and responding by notifying said access governor whether to allow a user access to said restricted area;
   an access node, separate from said indicator, positioned near said structure and having a short-range wireless radio for connecting to the wireless user device;
   a server operable to receive an unlock request associated with a wireless user device and a restricted area from said access node and transmit an authorized request to said access node upon authorizing said access request using said database,
   wherein said access request is authorized only if received from an access node authorized to permit access to said restricted area and originated from a wireless user device authorized to access said restricted area.

12. The access system according to claim 11, wherein said access node, comprises:
   a first short-range wireless radio using a wireless networking standard for receiving a wireless access request directly from a wireless user device; and
   a second short-range wireless radio using a wireless networking standard to transmit an unlock command directly to said locking device to permit access to said restricted area in response to receiving an authorized request.

13. The access system according to claim 11, wherein said access governor is an authorized airline personnel.

14. The access system according to claim 11, wherein said restricted area is an airline gate.

15. The access system according to claim 11 further comprising a secondary authenticator.

16. The access system according to claim 11, wherein said restricted area is a public transit terminal.

17. The access system according to claim 11, wherein said restricted area is a vehicle.

18. The access system according to claim 11, wherein said indicator has a short range wireless transmitter suitable for sending access notifications to another wireless device indicating the accessibility of user to said restricted area.

19. The access system according to claim 11, wherein said access node is configured to trigger a fee to an electronic wallet that is linked to user when said server requires a fee to enter or exit said restricted area.

20. The access system according to claim 12, wherein said first short-range wireless radio uses first wireless networking standard for receiving a wireless access request directly from a wireless user device; and
   said second short-range wireless radio uses a second wireless networking standard which is different than said first wireless networking standard.

* * * * *